US008287261B2

(12) United States Patent
Ninomiya et al.

(10) Patent No.: US 8,287,261 B2
(45) Date of Patent: Oct. 16, 2012

(54) MOLD FOR MANUFACTURING GOLF BALLS AND GOLF BALLS

(75) Inventors: Norikazu Ninomiya, Osaka (JP); Yoshihiro Fujikawa, Osaka (JP); Masahiro Michishita, Osaka (JP)

(73) Assignee: Mizuno Corporation, Osaka (JP)

( * ) Notice: Subject to any disclaimer, the term of this patent is extended or adjusted under 35 U.S.C. 154(b) by 870 days.

(21) Appl. No.: 12/218,808

(22) Filed: Jul. 19, 2008

(65) Prior Publication Data
US 2009/0023520 A1    Jan. 22, 2009

(51) Int. Cl.
B29C 70/70    (2006.01)
(52) U.S. Cl. .......................................... 425/116; 425/577
(58) Field of Classification Search ................... 425/116, 425/577, 468
See application file for complete search history.

(56) References Cited

U.S. PATENT DOCUMENTS

| | | | |
|---|---|---|---|
| 3,177,280 A | 4/1965 | Ford et al. | |
| 3,640,028 A | 2/1972 | Richard | |
| 4,501,715 A | 2/1985 | Barfield | |
| 4,653,758 A | 3/1987 | Solheim | |
| 5,112,556 A | 5/1992 | Miller | |
| 5,201,523 A | 4/1993 | Miller | |
| 5,458,473 A * | 10/1995 | Banji | 425/116 |
| 5,874,038 A * | 2/1999 | Kasashima et al. | 264/279 |
| 5,947,844 A | 9/1999 | Shimosaka et al. | |
| 6,685,456 B2 | 2/2004 | Sajima | |
| 6,719,647 B2 * | 4/2004 | Sajima | 473/382 |
| 2002/0096801 A1 * | 7/2002 | Puniello et al. | 264/278 |

FOREIGN PATENT DOCUMENTS

| | | | |
|---|---|---|---|
| JP | 61-173907 A | 8/1986 | |
| JP | 2780538 | 4/1993 | |
| JP | H5-300952 | 11/1993 | |
| JP | 06143349 A | * 5/1994 | |
| JP | 3384254 | 3/1997 | |
| JP | H10-099469 | 4/1998 | |
| JP | H10-179808 | 7/1998 | |
| JP | 3912448 | 5/1999 | |
| JP | 2001-187172 A | 7/2001 | |
| JP | 2002-159598 A | 6/2002 | |

* cited by examiner

Primary Examiner — Yogendra Gupta
Assistant Examiner — Ninh Le
(74) Attorney, Agent, or Firm — Day Pitney LLP

(57) ABSTRACT

The present invention relates to a mold having a parting line along dimples which allows manufacturing of golf balls free from burrs, and to golf balls manufactured using such a mold. The mold of the present invention is provided with a spherical cavity inside thereof; and an upper mold and a lower mold separable from each other, wherein a plurality of convex portions for forming dimples is provided in the inner surface of the cavity, at least one of the plurality of convex portions lies over the equator of the cavity, a parting line, which corresponds to the boundary between the upper mold and the lower mold, extends along the inner surface of the cavity, the parting line comprises first lines extending along the peripheries of the convex portions lying over the equator and second lines connecting the first lines, and the first line is disposed apart from the periphery by a distance of 0.1 to 0.5 mm.

1 Claim, 5 Drawing Sheets

F I G. 7
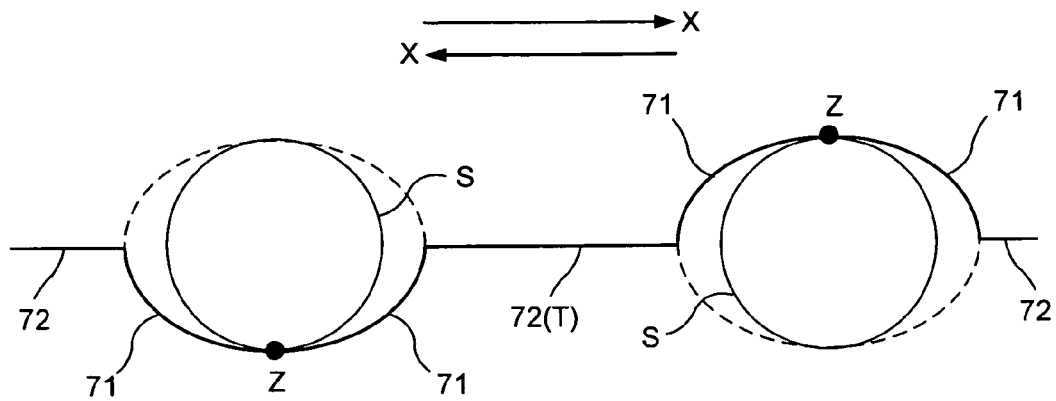
F I G. 8
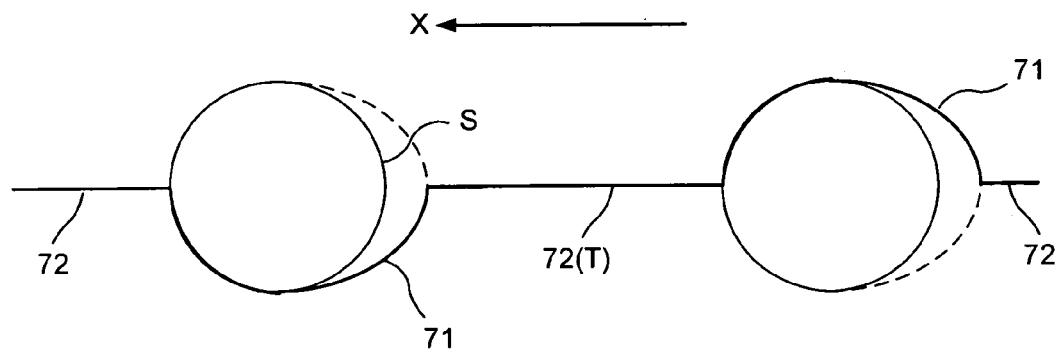

MOLD FOR MANUFACTURING GOLF BALLS AND GOLF BALLS

TECHNICAL FIELD

The present invention relates to a mold for manufacturing golf balls. The mold has a spherical cavity inside thereof and can be separated into an upper mold and a lower mold. The present invention also relates to a golf ball manufactured using such mold.

BACKGROUND ART

A mold that can be separated into an upper mold and a lower mold is used in manufacturing golf balls by injection molding or compression molding. In such a mold, the location of the parting line, where the upper mold and the lower mold are separated from each other, on the surface of the ball is critically important. Therefore, the location of the parting line is selected in consideration of various aspects, including ease of arranging dimples and preparing a mold, designability, etc. One possible arrangement is that a parting line is formed along the equator of the cavity, and no dimples are disposed on the parting line. This arrangement allows a parting line to be easily formed; however, because dimples are disposed avoiding the parting line, the space between dimples having the parting line in between becomes unduly large. This adversely affects the designability. In an alternate method, the dimples are formed so as to lie over the equator of the cavity and the parting plane is formed along the peripheries of the dimples. In this method, the dimples can be closely arranged regardless of the location of the parting line. Therefore, although the formation of the parting line is difficult, good designability can be achieved in this arrangement.

However, as disclosed in Japanese Unexamined Patent Publication No. 1998-179808, the arrangement in which dimples are disposed so as to lie over the equator of the cavity is not desirably employed in recently used golf balls having a Shore D hardness of less than 60, in particular when a soft cover material, other than ionomer resin, is used (when an ionomer resin having a low hardness is used, the arrangement is also undesirable). Grinding may not be successfully conducted when such a soft cover material is used because of the too soft burrs formed, or may result in a rough ground surface.

When a mold separable into two parts is used, the resulting golf ball has burrs on the parting plane at which the mold is separated into an upper mold and a lower mold. Such burrs need to be removed by grinding, etc. When a parting line is formed along the peripheries of dimples which lie over the equator, burrs are formed along the peripheries of dimples. However, as shown in FIG. 9, a burr 100 formed on the periphery of dimple may fall into the dimple 200 when grinding is conducted in the direction shown by the arrow X to remove the burrs. If this happens, the burr 100 is hidden in the dimple 200 and may not be removed. (Note that, burrs are usually formed in a wall-like shape along the space where an upper mold and a lower mold come into contact; however, in order to schematically illustrate the status of the burrs when cut, FIG. 9 shows a cross-sectional view in the vicinity of the ball surface, and the cross section of the burr is illustrated as triangular.)

An object of the present invention is to provide a mold having a parting line along dimples. Using such a mold makes it possible to manufacture golf balls from which burrs can be successfully removed. Another object of the present invention is to provide golf balls manufactured using such a mold.

SUMMARY OF THE INVENTION

A first mold of the present invention is provided with a spherical cavity inside thereof and an upper mold and a lower mold separable from each other.

The inner surface of the cavity is provided with a plurality of convex members for forming dimples, and at least one of the plurality of convex members lies over the equator of the cavity.

The parting line, which corresponds to the boundary between the upper mold and the lower mold and extends along the inner surface, is formed from first lines extending along the periphery of the convex member lying over the equator and second lines connecting the first lines, wherein the first line locates 0.1 to 0.5 mm apart from the periphery.

The second mold of the present invention is provided with a spherical cavity inside thereof; and an upper mold and a lower mold separable from each other.

The inner surface of the cavity is provided with a plurality of convex members for forming dimples, and at least one of the plurality of convex members lies over the equator of the cavity.

The parting line, which corresponds to the boundary between the upper mold and the lower mold and extends along the inner surface, is formed from first lines extending along the periphery of the convex member lying over the equator and second lines connecting the first lines, wherein the first line locates 0.1 to 0.5 mm apart from the periphery.

The first line coincides with a portion of the periphery at the location most far from the equator on the periphery and/or in the vicinity thereof and locates 0.1 to 0.5 mm apart from the periphery in the rest portions.

The third mold of the present invention is provided with a spherical cavity inside thereof and an upper mold and a lower mold separable from each other.

The plurality of convex members for forming dimples are provided in the inner surface of the cavity, and at least one of the plurality of convex members lies over the equator of the cavity.

The parting line, which corresponds to the boundary between the upper mold and the lower mold and extends along the inner surface, is formed from first lines extending along the periphery of the convex member lying over the equator and second lines connecting the first lines.

The first line coincides with a portion of the periphery on the periphery at and/or in the vicinity of the location most far from the equator, and the portion connected to the second line, the rest portion of the first line locates 0.1 to 0.5 mm apart from the periphery.

In the above-described construction, the parting line of the upper mold and the lower mold is formed at the location with a specific distance from the periphery of a dimple that crosses over the equator. Accordingly, the burrs are formed apart from the periphery of the dimple. In such an arrangement, when burrs are removed by grinding, etc., the burrs fall not inside the dimples but along the surface of the ball, i.e., the portion where no dimples are formed. This achieves the removal of the burrs in a reliable manner. The distance from the first line to the periphery of the dimple is preferably 0.1 to 0.5 mm. If the distance is less than 0.1 mm, the space between the burr and the periphery of the dimple becomes too small, and this may cause the burr falling inside the dimple. Setting the distance larger than 0.5 mm requires a wide space between the dimples, and this may hamper the close arrangement of the dimples.

When burrs are removed by grinding or cutting, the grinding or cutting is usually conducted in a single direction. In case of burrs are removed by grinding, for example, a grinder is made in contact with a golf ball while rotating the ball in a single direction. Therefore, the burrs fall only in the rotation direction of the golf ball. In this case, some burrs fall not into the dimple but in the direction apart from the dimple. Having such burrs at the peripheries of dimples causes no problem. Therefore, depending on the grinding direction, it is not necessary to separate the first line from the periphery of dimple in the entire length thereof. In other words, it is necessary to separate the first line from the dimple only in the portion where the burrs may fall into the dimple. The second and third inventions have been accomplished in view of the above-mentioned aspect. The second invention is effective, for example, when removal of burrs is conducted along the equator. The third invention is effective when removal of burrs is conducted in one direction in parallel to the equator.

The above-mentioned mold may take various forms and one example of the construction thereof is as below. At least one concave portion is provided in each of the surfaces where the upper mold and the lower mold come into contact. The mold is provided with at least one convex member placed in the space formed by the corresponding concave portions in the upper mold and the lower mold, fixed to either concave portion, and has convex portion lying over the equator on the surface facing to inside the cavity. In the periphery of the convex member on the surface facing the inside the cavity, a portion that is not fixed to the concave portion coincides with the first line.

In the first invention, the convex member may include a convex surface facing the inside of the cavity and a flat surface circularly formed at the periphery of the convex surface. Here, the flat surface meets the inner surface of the mold and the width thereof corresponds to the distance between the first line and the periphery of the convex member.

The golf balls of the present invention, which solve the problems described above, are molded using the above explained mold. The present invention provides a golf ball from which burrs are successfully removed.

The present invention provides a mold in which a parting line is formed along the dimples and by which burrs are reliably removed.

BRIEF DESCRIPTION OF DRAWINGS

FIG. 7 is a plan view showing another example of the parting line.

FIG. 8 is a plan view showing still another example of the parting line.

BEST MODE FOR CARRYING OUT THE INVENTION

Figure 1:
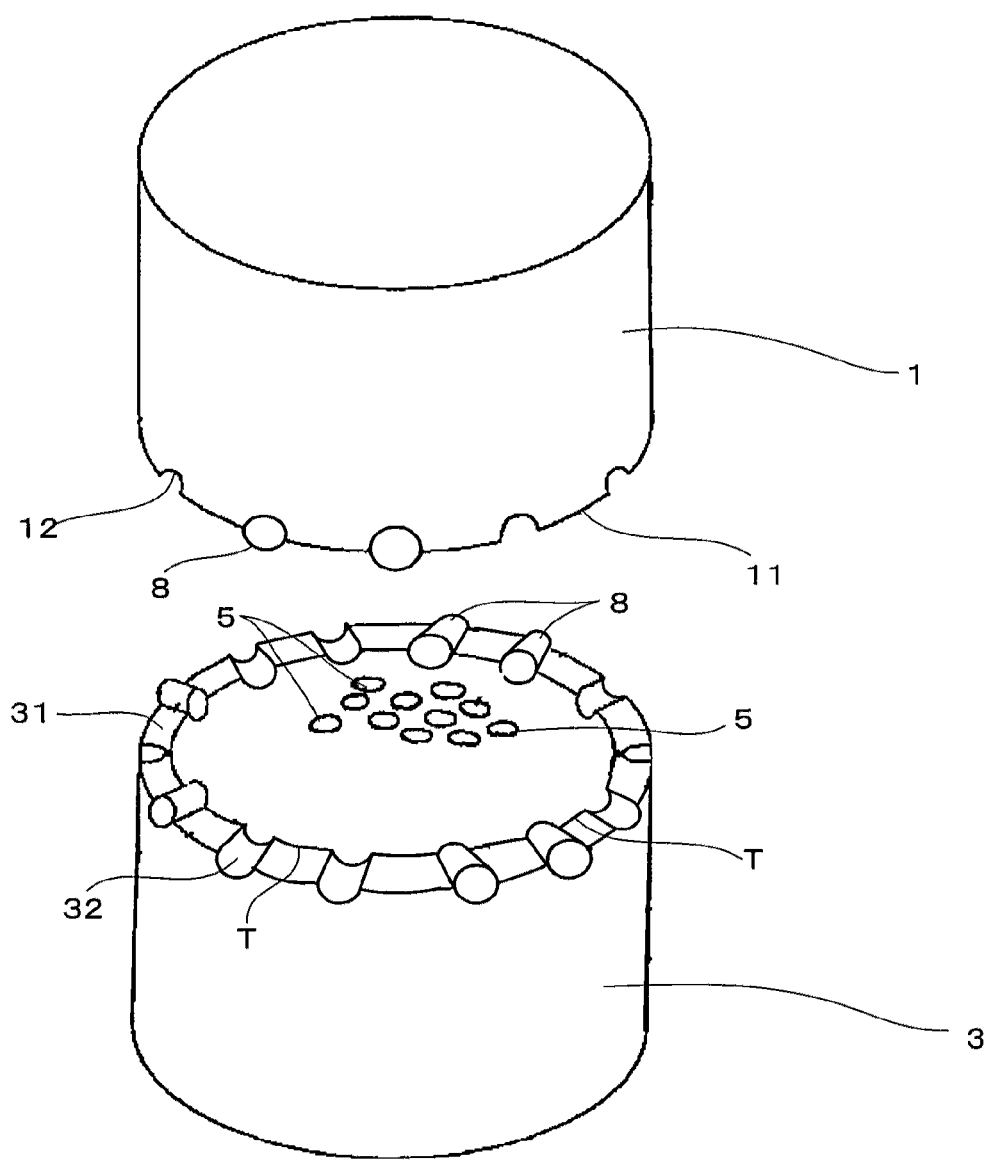
FIG. 1 is a perspective view of a mold for a golf ball according to one embodiment of the present invention.

One embodiment of the mold for golf ball of the present invention is explained below with reference to the drawings. FIG. 1 is a perspective view of the mold of the present embodiment, and FIG. 2 is a front view of the inside wall of the cavity of the mold.

The mold of FIG. 1 is for molding a cover of a golf ball, wherein the mold has a spherical cavity inside thereof, and is separable into an upper mold 1 and a lower mold 3 as shown in FIG. 1. A large number of convex portions 5 are formed in the wall surface of the cavity to form dimples. Each of the convex portions 5 is formed so as to have a circular shape as seen in a plan view, which corresponds to the shape of the dimple. Some of the convex portions 5 lie over the equator of the cavity T. Hereunder, the convex portions lying over the equator T is referred to as the first convex portion 51 and others are referred to as the second convex portion 52 (see FIG. 2).

Figure 2:
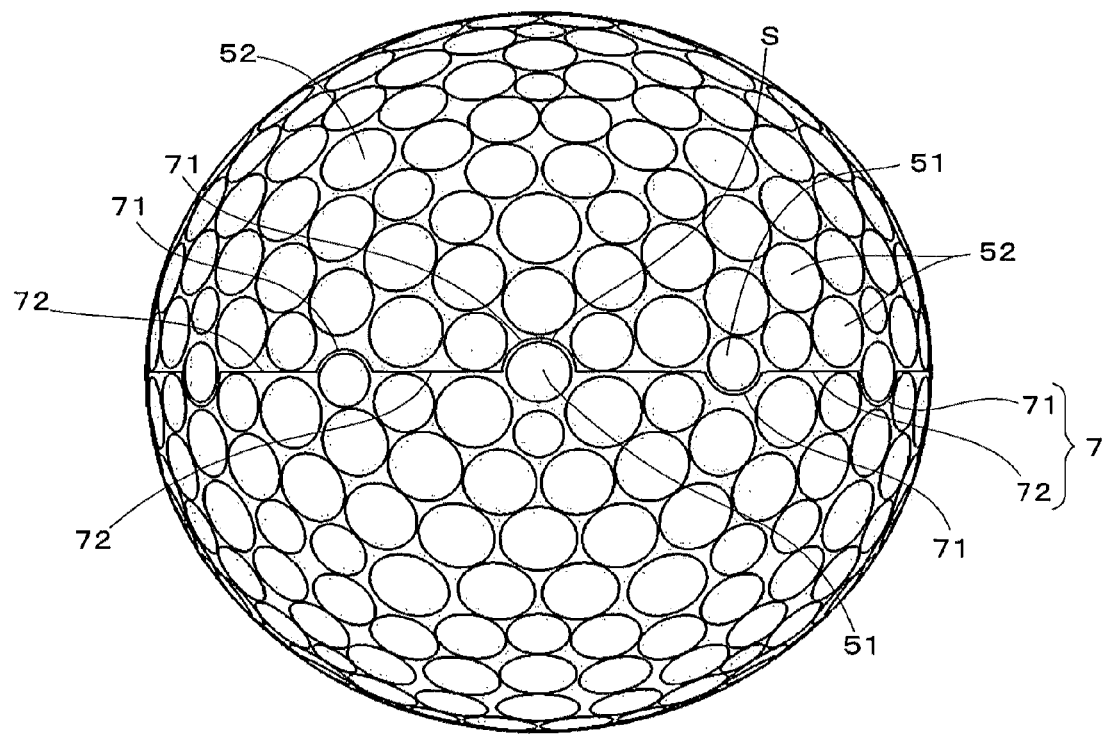
FIG. 2 is a plan view of the cavity of the mold of FIG. 1.

As shown in FIG. 2, the parting line 7 formed along the inner surface of the cavity, i.e., the boundary between the upper mold 1 and the lower mold 3, is formed from first lines 71 locating along the first convex portions 51 and second lines 72 locating on the equator T. Each of the first lines 71 has a semicircular shape and they are alternately arranged in such a manner that two consecutive first lines 71 are convex to the upper mold 1 and the next two consecutive first lines 71 are convex to the lower mold 3. The first line 71 passes through the location separated from the periphery of the dimple S by the distance of 0.1 to 0.5 mm.

In order to form such a parting line 7, the mold has the following construction. As shown in FIG. 1, each of the upper mold 1 and the lower mold 3 has twelve concave portions (i.e., concave portions 12 and 32) along the equator T on the contact surfaces 11 and 31, where the upper mold 1 and the lower mold 3 meet to each other. The concave portions 12 and 32 have a semicircular cross section and are communicably open to inside of the cavity. By making the corresponding concave portions 12 and 32 in the upper mold 1 and the lower mold 3 to meet with each other, cylindrical spaces are formed. A convex member 8 forming the first convex portion 51 described above is situated in each of the cylindrical spaces.

Figure 3:
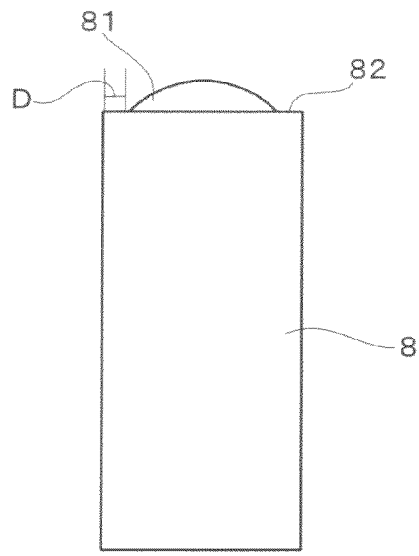
FIG. 3 is a plan view showing a convex member.
Figure 4:
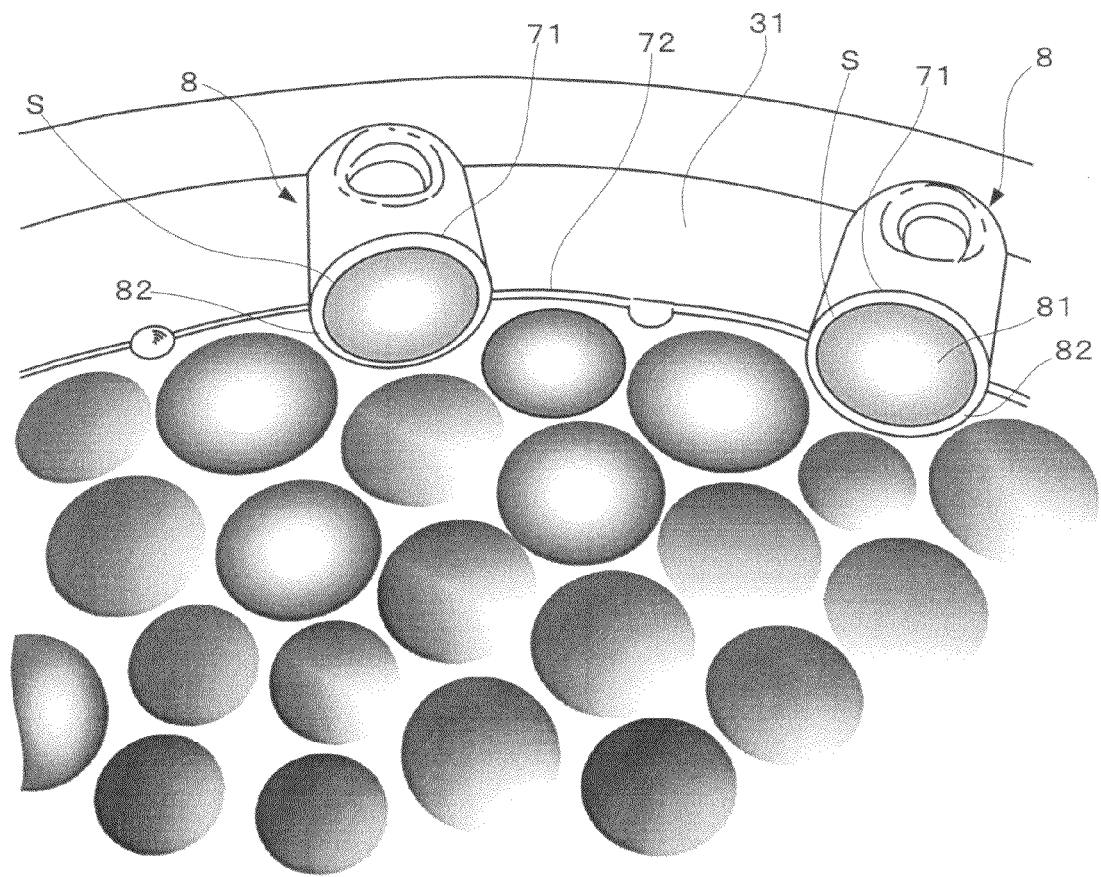
FIG. 4 is a perspective view of the main components of the lower mold of the mold of FIG. 1.

FIG. 3 is a plan view of the convex member, and FIG. 4 is an enlarged view of the inner surface of the lower mold. As shown in FIG. 3, the convex member 8 is cylindrically shaped and is fixed to one of the concave portions 12 of the upper mold 1 and concave portions 32 of the lower mold 3. Specifically, as described above, convex members are alternately disposed in two consecutive concave portions 12 of the upper mold 1 and two consecutive concave portions 32 of the lower mold 3 along the equator. The convex member 8 is formed from a convex surface (convex portion) 81, which forms a dimple and faces the cavity, and a flat surface 82, which is formed in a ring-like shape around the convex member 8. When the convex member 8 is disposed in a concave portion 12 or 32, the flat surface 82 is coincident with the inner surface of the cavity (see FIG. 4). The width D of the flat surface 82 corresponds to the distance between the first line 71 and the periphery of the dimple S as described above. In other words, the first line 71 is coincident with the external periphery of the flat surface 82. The flat surface 82 does not have to be perfectly flat and may curve along the shape of the inner surface of the cavity.

Figure 5:
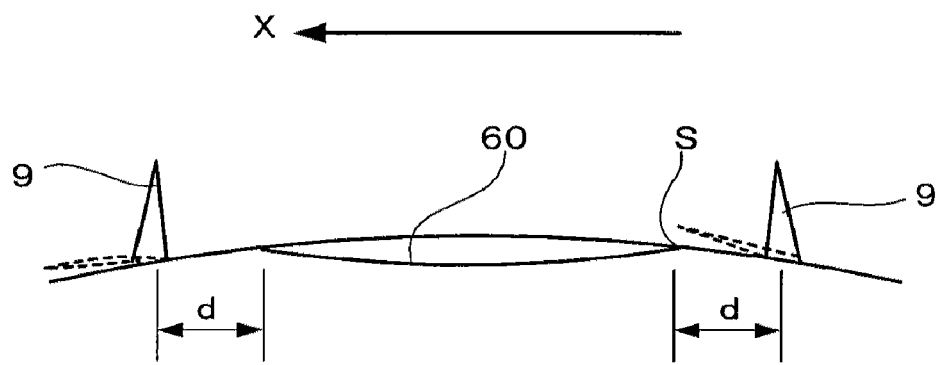
FIG. 5 schematically illustrates the cross-sectional view in the vicinity of the surface of the golf ball obtained using the mold of FIG. 1.
Figure 6:
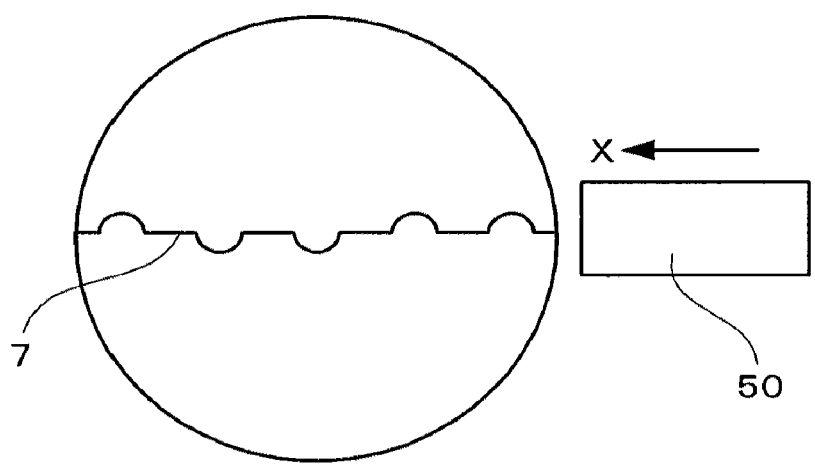
FIG. 6 is a plan view illustrating the removal of burrs.
Figure 9:
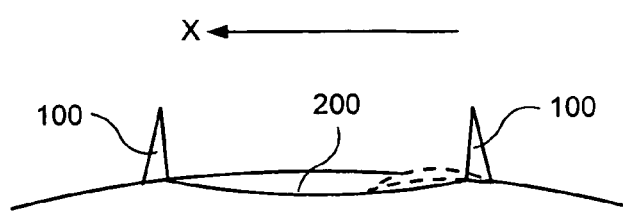
FIG. 9 schematically illustrates the cross-sectional view in the vicinity of the surface of the golf ball produced using a known mold.

A process of forming a cover and removing burrs is explained below with reference to FIGS. 5 and 6. FIG. 5 is a cross-sectional view of the surface of a ball, and FIG. 6 is a plan view illustrating the removal of burrs. First, a semi-finished product to be provided with a cover is placed in the above-described mold, and then a cover is formed by a known injection molding. When the resulting ball is removed from the mold, burrs are found along the parting line 7 shown in FIG. 2. Specifically, as shown in FIG. 5, the ball molded using the mold of the present embodiment, burrs 9 are formed at the location separated from the periphery of a dimple by the distance d unlike conventional techniques wherein burrs are formed on the periphery S of the dimple 60 that is disposed on the equator T. The distance d corresponds to the width D of the flat surface 82 of the convex member 8 described above. Subsequently, burrs 9 are removed from the thus-formed ball by moving a grinder 50 along the equator (i.e., in the direction shown by the arrow X) as shown in FIG. 6, obtaining a golf ball as a final product.

As described above, because the parting line 7 between the upper mold 1 and the lower mold 3 is formed with a predetermined distance from the periphery of the dimple S lying over the equator T, the burrs 9 are formed at the locations separated from the periphery of the dimple S by the predetermined distance in the present embodiment. Therefore, as shown in FIG. 5, when the burrs 9 are pressed by the grinder 50 traveling in the direction as shown by the arrow X, the burrs 9 fall along the surface of the ball. Unlike a conventional technique, this arrangement prevents the burrs 9 from being hidden in a dimple, so that the burrs 9 are reliably removed. (Note that the burrs are inherently formed in a wall-like shape along the space formed between the convex member for forming a dimple and the concave portion that has a semicircular cross section and opens to the inside of the cavity as shown in FIG. 1. However, in order to schematically show the conditions of the burrs while cutting, FIG. 5 shows a cross-sectional view in the vicinity of the surface, and the cross section of the burr is triangular here.)

One embodiment of the present invention is explained above; however, the scope of the present invention is not limited to the above embodiment and various modifications may be added without departing from the scope and spirit of the present invention.

For example, in the present embodiment, two consecutive convex members 8 are alternately disposed on the upper mold 1 and the lower mold 3. However, the arrangement of the convex members 8 is not limited to this, and each of the convex members 8 may be disposed on the upper mold 1 and the lower mold 3 alternately. It is also possible to dispose all of the convex members 8 on the upper mold 1 or the lower mold 3. The mold may be unitedly formed without disposing the convex member 8. In other words, the structure of the mold is not limited as long as the first line 71, which is a part of the parting line 7, is formed with a predetermined distance from the periphery of dimple S. In the present embodiment, the second line 72 is formed along the equator T; however, the second line 72 may pass the region other than the equator. For example, the first lines 71 may be connected to each other with passing through the space between the dimples in the region other than the equator.

In the present embodiment, the first line 71 is formed apart from the periphery of the dimple S throughout its length; however, some portions of the first line 71 may be in contact with the periphery S of the dimple (i.e., the periphery of convex portion 5). When a grinder or a cutter travels in the directions as shown in the arrows X i.e., the directions x along the equator on the equator while removing burrs as shown in FIG. 7, even if a burr is formed at the location Z, which is the most far from the equator in the periphery of the dimple S, the burr is pressed in the directions as shown in the arrows X and never comes into the dimple. Therefore, a construction as shown in FIG. 7, wherein the first line 71 meets the periphery of the dimple S at the location Z which is the most far from the equator T, may be employed.

When the burrs are removed being pressed in a single direction X along the equator as shown in FIG. 8, providing a space between the first line 71 and the periphery of dimple S is necessary only in the upstream side in the traveling direction X of the grinder (i.e., the right side in the figure). This is because burrs fall in the direction apart from the dimple in the downstream side in the traveling direction X of the grinder. Accordingly, the first line and the periphery of the dimple can be made coincident in the in the downstream side.

The invention claimed is:

1. A mold for manufacturing golf balls, comprising:
an upper mold and a lower mold separable from each other having a spherical cavity inside thereof;
wherein a plurality of convex portions for forming dimples are provided in the inner surface of the cavity;
at least one of the plurality of convex portions lies over the equator of the cavity;
a parting line, which corresponds to the boundary between the upper mold and the lower mold, extends along the inner surface of the cavity,
the parting line comprises first lines extending along the peripheries of the convex portions lying over the equator and second lines connecting the first lines,
the first line is situated apart from the periphery by a distance of 0.1 to 0.5 mm,
wherein a concave portion is provided in each of the surfaces where the upper mold and the lower mold come into contact,
the mold comprises at least one convex member placed in the space formed by the corresponding concave portions in the upper mold and the lower mold, fixed to either concave portion, and has convex portion lying over the equator on the surface facing inside the cavity, and
in the convex member, the surface facing the inside of the cavity comprises a convex surface forming the convex portion and a flat surface formed in ring-like shape around the convex surface, and
the flat surface coincides with the inner surface of the mold and its width corresponds to the distance between the first line and the periphery of the convex portion; and
wherein an external periphery of the flat surface is located apart from the periphery of the convex surface at a predetermined width D on the entire periphery thereof.

* * * * *

UNITED STATES PATENT AND TRADEMARK OFFICE
CERTIFICATE OF CORRECTION

| | | |
|---|---|---|
| PATENT NO. | : 8,287,261 B2 | Page 1 of 1 |
| APPLICATION NO. | : 12/218808 | |
| DATED | : October 16, 2012 | |
| INVENTOR(S) | : Norikazu Ninomiya et al. | |

It is certified that error appears in the above-identified patent and that said Letters Patent is hereby corrected as shown below:

On the Title of the patent, line (2) "Filed" incorrectly reads as follows:
"Filed: July 19, 2008"

On the Title of the patent, line (2) "Filed" should read as follows:
"Filed: July 18, 2008"

Signed and Sealed this
Eleventh Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,287,261 B2 | Page 1 of 1 |
| APPLICATION NO. | : 12/218808 | |
| DATED | : October 16, 2012 | |
| INVENTOR(S) | : Norikazu Ninomiya et al. | |

It is certified that error appears in the above-identified patent and that said Letters Patent is hereby corrected as shown below:

On the Title Page of the patent, item (30) "Foreign Application Priority Data" has been omitted.

On the Title Page of the patent, item (30) "Foreign Application Priority Data" should read as follows:
"July 20, 2007    (JP)........................ 2007-190094"

Signed and Sealed this
Twenty-second Day of July, 2014

Michelle K. Lee
*Deputy Director of the United States Patent and Trademark Office*